United States Patent [19]
Parker

[11] Patent Number: 5,326,174
[45] Date of Patent: Jul. 5, 1994

[54] TEMPERATURE INDICATOR

[76] Inventor: Robert Parker, 411 Rolling La., Alamo, Calif. 94507

[21] Appl. No.: 889,670

[22] Filed: May 28, 1992

[51] Int. Cl.$^5$ .................... G01K 11/12; G01K 11/18
[52] U.S. Cl. .................... 374/134; 374/162; 374/161; 374/208; 116/216
[58] Field of Search ............ 374/134, 161, 162, 106, 374/208; 116/216, 217

[56] References Cited

U.S. PATENT DOCUMENTS

| | | | |
|---|---|---|---|
| 493,197 | 3/1893 | Tagliabue | 374/156 |
| 2,490,933 | 12/1949 | Tornquist et al. | 374/162 |
| 3,243,303 | 3/1966 | Johnson | 116/217 |
| 3,690,175 | 9/1972 | Butts | 374/134 |
| 3,769,932 | 11/1973 | Romito et al. | 374/134 |
| 3,961,531 | 6/1976 | Peng | 374/156 |
| 3,964,313 | 6/1976 | Connick | 374/134 |
| 3,998,099 | 12/1976 | Chadwick | 374/134 |
| 4,137,769 | 2/1979 | Parker | 374/134 |
| 4,805,188 | 2/1989 | Parker | 374/141 |

FOREIGN PATENT DOCUMENTS

| | | | |
|---|---|---|---|
| 3342939 | 11/1984 | Fed. Rep. of Germany | 374/134 |
| 1559645 | 3/1969 | France | 374/162 |
| 2389308 | 12/1978 | France | 374/162 |
| 0059129 | 4/1982 | Japan | 374/162 |
| 0650429 | 8/1981 | U.S.S.R. | 374/134 |
| 2151862 | 7/1985 | United Kingdom | 374/134 |

Primary Examiner—William A. Cuchlinski, Jr.
Assistant Examiner—Diego F. F. Gutierrez
Attorney, Agent, or Firm—Flehr, Hohbach, Test, Albritton & Herbert

[57] ABSTRACT

A temperature indicator for indicating the temperature condition of an object while subjecting the object to an external temperature environment. The temperature indicator includes a substantially transparent outer shell containing a substantially transport modeling structure, which includes a plurality of heat receiving elements, for modeling the thermal diffusivity of the object. The indicator also includes a temperature measuring device in thermal contact with the modeling structure for measuring the temperature within the outer shell to thereby indicate the temperature condition of the object. The outer shell including first and second sections which apply a compressive force to the modeling structure when the first and second sections are secured together to thereby confine the modeling structure within the outer shell.

38 Claims, 4 Drawing Sheets

TEMPERATURE INDICATOR

BRIEF DESCRIPTION OF THE INVENTION

The present invention relates in general to a device for indicating the temperature condition of an object. More particularly, the present invention relates to a temperature indicator for simulating the temperature condition of an object while subjecting the object to an external temperature environment.

BACKGROUND OF THE INVENTION

When applying heat for the purposes of cooking, canning or sterilizing an object, the process is completed once the object has attained a specific internal temperature. The internal temperature of the object is often estimated by measuring the time period over which the object is exposed to a heat source. Generally, several factors influence the heating process, such as the number of objects concurrently being heated, the initial temperature of the utensils and the object, the actual temperature of the heat source and the altitude at which heat is applied. Due to the wide variety of factors influencing the heating process, timing the process does not provide a true indication of the object's temperature condition. A more accurate determination as to when an object is fully heated is obtained by actually measuring its internal temperature.

In certain instances the internal temperature of an object may be measured during the application of heat. For example, meat thermometers and candy thermometers include probes for insertion into the substance being heated. However, with certain objects, measuring the internal temperature is not feasible. A temperature probe cannot be inserted into an object having an impenetrable outer surface, such as an egg, canned product or other sealed container. Thus, the internal temperature of the object must be estimated, as by measuring the time required for heating the object or by simulating the temperature condition within the object.

One method of determining the internal temperature of an object or container is by placing a device in thermal contact with the outer surface of the container. U.S. Pat. No. 4,805,188 discloses a time-temperature indicator having a thermochromic material placed within a cylinder with one end of the material in thermal contact with the container or closed vessel. When the temperature within the container increases to a certain level, the thermochromic material will change color indicating the temperature of the contents. The disclosed device indicates the temperature of the contents by responding to heat diffusing through the container lid. The temperature-time indicator, while providing an accurate estimate for some containers, is not particularly suitable for measuring the internal temperature of an object in which the temperature at the exterior surface does not represent the object's internal temperature. A temperature indicator for simulating the internal temperature of an object independent of the temperature at the object's surface is desirable.

An alternative method of simulating an object's internal temperature is by concurrently heating a temperature indicating device with the object. U.S. Pat. No. 4,137,769 discloses a time-temperature indicator having a thermally responsive indicator material embedded in a solid body of transparent plastic material. The plastic material preferably has a thermal diffusivity approximating that of the object being heated. The rate at which heat diffuses into the time-temperature indicator approximates the rate at which heat diffuses through the object.

During heating, the time-temperature indicator and the object will be exposed to the same conditions. Since the rate at which the object and the disclosed device are heated is approximately equal, measuring the internal temperature of the device will provide a substantially accurate estimate of the internal temperature of the object. The indicator material responds to the occurrence of a predetermined temperature within the device, thereby indicating that sufficient heat has been supplied to complete the heating process.

To insure that the indicating material is responding to heat diffusing through the plastic, in the disclosed device the indicator material is embedded within a solid body by pouring a hardenable plastic into a mold in layers. The layers of plastic bond together, forming the solid body. However, exposing the solid plastic device to a large temperature change introduces significant thermal stresses. With repeated use, the thermal stresses often cause delamination or separation of the solid body and failure of the assembly. A temperature indicator which may be repeatedly exposed to changes in temperature without developing significant thermal stresses is highly desirable.

The internal stresses introduced by repeated exposure to a temperature gradient also induce the formation of surface cracks and the emission of objectionable odors. In addition, embedding the indicating material within a solid body is a time consuming and labor intensive process which is not precisely repeatable. A temperature indicator which may be efficiently and economically manufactured is desirable. Similarly, a temperature indicating device which may be repeatedly subjected to a temperature gradient without the formation of cracks or the emission of offensive odors is desirable.

OBJECTS AND SUMMARY OF THE PRESENT INVENTION

It is a primary object of the present invention to provide a temperature indicator for simulating the internal temperature of an object exposed to an external temperature environment.

A further object of the present invention is to provide a temperature indicator which may be exposed to a large temperature gradient without the development of thermal stresses.

An additional object of the present invention is to provide a temperature indicator which may be repeatedly exposed to a change in temperature without the formation of internal stresses.

Another object of the present invention is to provide a temperature indicator which may be repeatedly used without the development of cracks or the emission of objectionable odors.

A more general object of the present invention is to provide a temperature indicator which may be efficiently and economically manufactured.

In summary, the present invention provides a time indicator which is particularly suitable for indicating the internal temperature of an object while exposing the object to an external temperature environment. The temperature indicator includes a modeling structure for modeling the thermal diffusivity of an object and a temperature measuring device in thermal contact with the modeling structure. The modeling structure and the temperature measuring device are enclosed within an outer shell. When an object and the temperature indicator of the present invention are subjected to a temperature environment, the temperature measuring device measures the temperature within the outer shell, thereby indicating the temperature condition of the object.

In one embodiment of the present invention, the modeling structure includes a plurality of heat receiving elements. The heat receiving elements are formed of a material having a thermal diffusivity such that when the elements and the object are subjected to a temperature environment, the rate at which heat diffuses through the elements is proportional to the rate at which heat diffuses through the object. Thus, the temperature indicator accurately simulates the temperature condition of the object. The object's internal temperature may thereby be determined without actually measuring the temperature.

Additional objects and features of the present invention will be more readily apparent from the following detailed description and appended claims when taken in conjunction with the drawings.

DETAILED DESCRIPTION OF THE INVENTION

Reference will now be made in detail to the preferred embodiment of the invention, which is illustrated in the accompanying figures. Turning now to the drawings, wherein like components are designated by like reference numerals throughout the various figures, attention is directed to FIGS. 1 and 2.

Figure 1:
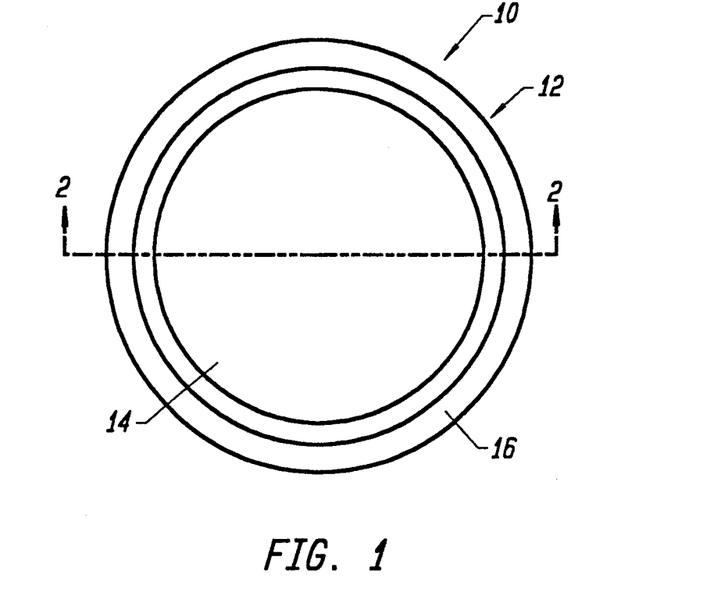
FIG. 1 shows a top plan view of a temperature indicator in accordance with the present invention.
Figure 2:
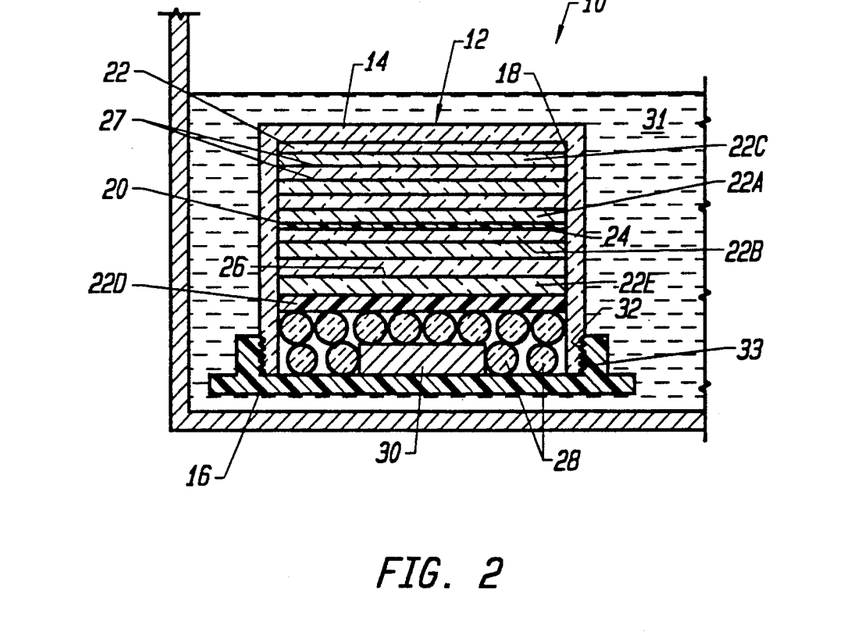
FIG. 2 shows a cross section view taken along line 2—2 of FIG. 1 shown submerged in a fluid.

A temperature indicator 10 incorporating the present invention is shown generally in FIGS. 1 and 2. The temperature indicator, which is particularly suitable for determining the temperature condition of an object, includes an outer shell 12 having first and second sections 14 and 16 and an inner surface 18 defining a cavity 20. The outer shell or housing encloses means for modeling the thermal diffusivity of an object, such as a plurality of heat receiving elements 22. When indicator 10 and an object (not shown) are subjected to an external temperature environment, heat will diffuse through the indicator in approximately the same manner as it permeates into the center of the object. The heat receiving elements are formed having the same temperature response characteristics as the object.

In the present embodiment, temperature indicator 10 is designed for determining the internal temperatures of at least one food item, such as an egg, during cooking or of an object during sterilization. As is shown in FIGS. 1 and 2, the shape of outer shell 12 is generally that of a cylinder. Heat receiving elements 22 are formed of a polymeric material having a thermal diffusivity such that when heat is concurrently applied to indicator 10 and the food item or the object to be sterilized, the rate at which heat permeates into the center of the indicator is proportional to the rate of diffusion into the food item or object. Heat diffuses through the outer shell and into elements 22. Thus, the temperature indicator of the present invention models the thermal diffusivity without duplicating the size or shape of the heated object. In an alternative form, the outer shell may have a shape similar to the food item or object. Hereinafter, the term "object" will apply equally to a food item and an object to be sterilized.

In the preferred embodiment, the heat receiving elements are configured as thin disks substantially fitting within cavity 20. The disks have a thickness of approximately 120 to 125 mils. The disk-shaped elements are efficient to manufacture, as the disks are particularly suitable for injection molding. The disks may be consistently manufactured, without the problems of bubble formation and other inconsistencies which are common with the embedment molding process. While in the preferred form the heat receiving elements are formed as disks, other configurations may be substituted.

To determine the temperature condition of the object, temperature indicator 10 includes means for measuring the temperature within the outer shell, such as a layer of thermochromic material 24 in thermal contact with the heat receiving elements. Several types of thermochromic materials are available for indicating a variety of temperature conditions. Irreversible thermochromic materials respond by permanently changing colors, thereby providing evidence of the occurrence of a certain temperature. Reversible thermochromic materials undergo a color change in response to a particular temperature condition, and return to the original color once the temperature is no longer detected. Therefore, reversible thermochromic materials may be repeatedly used for measuring temperature. Irreversible thermochromic materials may be used as a record of the modeled internal temperature conditions of an object sterilized through heating.

The types of thermochromic material incorporated by the present invention include both reversible and irreversible thermochromic materials. One example is a "color to transparent" material which responds to a particular temperature by becoming transparent. The "color to transparent" materials are commercially available from manufacturers such as Matsui and Pilot Ink Co. Another example of a reversible thermochromic material suitable for use with the present invention is a "color to color material," such as a mercury salt which reversibly turns from red to black at 68° C. Alternatively, a thermochromic material which may be applied directly to heat receiving element 22 may be used. The thermochromic layer may indicate the occurrence of one predetermined temperature, or may alternatively respond to a range of temperatures. In another form, the layer may include one thermochromic material superimposed over another. Similarly, the layer may include different thermochromic materials positioned side by side.

In the present embodiment, thermochromic layer 24 is positioned between two heat receiving elements 22A and 22B. As heat diffuses through elements 22A and 22B, the thermochromic layer 24 indicates the temperature of the elements. When using a "color to transparent" material, the layer responds by becoming transparent to reveal any graphics imprinted below the material. With the "color to color" material, graphics may be imprinted on the material. The graphics may for example state the temperature, describe the temperature condition of the object (as in soft, medium, or hard for eggs), display a design or provide further instructions. Without the graphics, a change in color provides an indication of the temperature of the elements.

To display thermochromic layer 24, housing 12 and the heat receiving elements positioned above layer 24 are substantially transparent. By viewing the appearance of thermochromic layer 24, the temperature condition of the object may be monitored during the heating process. The heat receiving elements positioned below thermochromic layer 24 may similarly be formed of a transparent material. Alternatively, these elements may be substantially opaque. In the present embodiment, it is desirable to observe the entire layer of thermochromic material. In other embodiments, only a portion of the thermochromic layer may actually indicate the temperature. In these instances, the housing and the heat receiving elements need only display the indicating portion of the thermochromic layer.

When heat receiving elements 22 are stacked within housing 12, an air interface is introduced in between each element. For each air/element interface, there is approximately four percent light reflection which distorts the image of the thermochromic layer and detracts from the cosmetic appearance of the indicator. If the thermochromic layer is positioned below ten heat receiving elements, fifty percent of light is reflected. To improve the clarity and appearance of the thermochromic layer, in the present invention a lubricant film 27 is applied between each element. The film has an index of refraction approximating that of the elements. In the preferred form, the index of the film is substantially equal to that of the elements, thereby minimizing the reflection of light. By adding the lubricant film, the temperature indicator of the present invention provides a clear visual indication of the temperature condition of the object.

With certain applications, determining the temperature at several different points within the object may be desirable. The present invention provides a temperature indicator in which a thermochromic layer may be conveniently placed at different levels relative to elements 22. Cylinder-shaped housing 12 of the present embodiment is formed having a greater axial height than radial diameter Thermochromic layer 24 responds primarily to heat permeating radially into elements 22. When a thermochromic layer is placed in contact with element 22C near inner surface 18, heat diffusing through the top of housing 12 significantly contributes to the measured temperature. The temperature of element 22C increases more rapidly than at element 22A. Thermochromic layer 24 does not provide an accurate indication of the object's temperature at the location modeled by element 22C. Since the temperature indicating means may be placed at any level within indicator 10, the present invention is particularly suitable for accurately simulating the temperature at different locations within the object.

In the present embodiment, a layer of thermochromic material 26 has been applied to element 22D to measure the temperature of elements 22D and 22E. Thermochromic layer 24 is formed of a "color to transparent" material which will become transparent when at least one of elements 22A and 22B attain a particular temperature. Any graphics below layer 24 will be displayed and thermochromic layer 26 will be revealed. When elements 22D and 22E reach a particular temperature, thermochromic layer 26 will respond. Thermochromic layer 26 may be formed of a "color to transparent" material, a "color to color" material, or another type of thermochromic material. The thermochromic layers thereby indicate the temperature condition of the object. With the present invention, thermochromic layers 24 and 26 may respond to different temperatures. The layers may alternatively react to the same temperature, indicating the occurrence of the temperature at different locations within the object.

Any number of thermochromic layers may be introduced within outer shell 12. Thus, the present invention is particularly suitable for providing data on the temperature at different locations within an object subjected to an external temperature environment. In addition, temperature indicator 10 is capable of determining different temperature conditions within an object, or alternatively the temperature of a number of different objects.

Turning particularly to FIG. 2, a plurality of insulating elements 28 and a ballast element 30 are contained within housing 12 below thermochromic layer 26. The insulating elements substantially isolate layer 26 from heat diffusing through the bottom of the indicator. Since with the present embodiment thermochromic layer 26 responds primarily to heat diffusing radially through elements 22, the lower portion of indicator 10 may be formed in any configuration. Thus, temperature indicator 10 may be compact in size since only the upper portion models the thermal diffusivity of the object. When heating an object by placing it in a container of boiling water, such as when cooking an egg, temperature indicator 10 may rest on the bottom of the container. Insulating beads 28 isolate the thermochromic layers from the heat source, preventing distortion of the simulated temperature condition.

In the present invention, insulating elements 28 consist of hollow glass beads. However, other insulating materials may be substituted for the glass beads. Similarly, the insulating elements may be replaced by a plurality of heat receiving elements 22. In this form the height of the cylinder would be increased, raising the location of thermochromic layer 26 relative to a heat source below the temperature indicator. If desired, the heat receiving elements below layer 26 could be configured for modeling the temperature response characteristic of the object.

Ballast element 30 provides stability when the temperature indicator is submerged in a fluid, generally designated 31 during the heating process. The weight provided by the ballast element may be sufficient to fully submerge the temperature indicator within a fluid. With the addition of the ballast element, the choice of materials for housing 12 and elements 22 is not restricted by the density of the materials. The elements and the housing may be formed of a light-weight material having a density lower than the fluid, with the ballast element providing the necessary weight for keeping temperature indicator 10 submerged.

Figure 4:
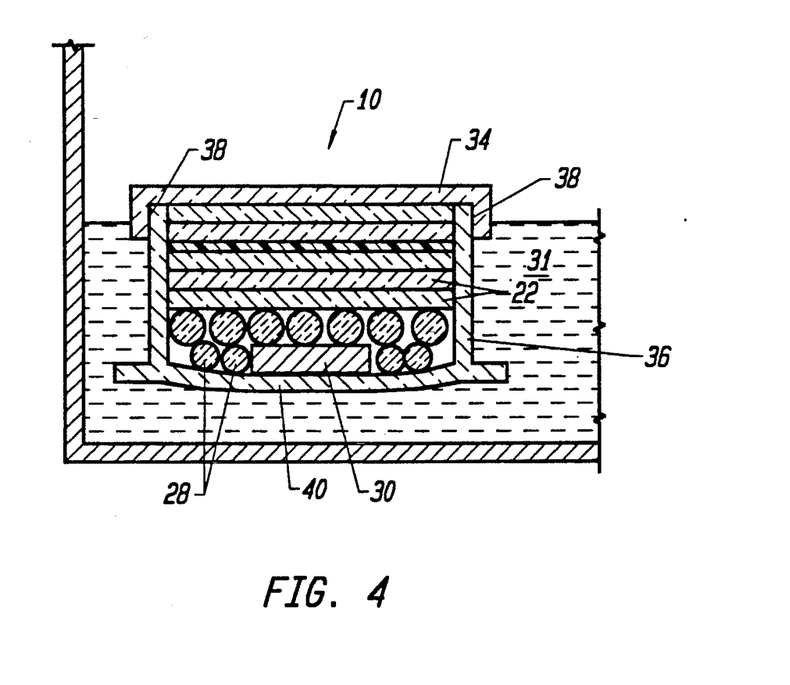
FIG. 4 shows a cross sectional view of the temperature indicator of FIG. 3, shown fully assembled and partially submerged in a fluid.

Alternatively, it may be desirable to float temperature indicator 10 in a fluid 31 with the top elements of the temperature indicator exposed above the surface and the thermochromic layer 24 submerged in the fluid, as in shown in FIG. 4. When indicator 10 is only partially submerged, the heat transfer through the top of indicator 10 is minimized. Thus, selected elements 22 above thermochromic layer 24 may be removed, reducing the amount of material used in constructing the temperature indicator. Partially submerging indicator 10 additionally eliminates the formation of bubbles on the temperature indicator which may obstruct or distort the view of the thermochromic layer. Ballast element 30 stabilizes the temperature indicator when partially submerged, ensuring that the thermochromic layer remains exposed above the surface of the fluid during the heating process.

The outer shell includes means for securing first and second sections 14 and 16 together, such as threaded portions 32 and 33 of first and second sections 14 and 16 respectively. Securing the first and second sections together by threaded engagement as in shown particularly in FIG. 2 substantially seals the components within the container. Thus, the present invention provides at least one single unit temperature indicator having multiple, separate components for modeling the temperature response characteristic of an object and measuring the temperature within the housing. Since the heat receiving elements, the thermochromic material and the other elements are secured within the housing, the individual elements need not be bonded together. This provides a greater freedom in choosing the material and shape of the heat receiving elements for accurately modeling the thermal diffusivity of the object. The formation of thermal stresses in response to exposure to a large thermal gradient is substantially prevented. Since the indicator comprises several separate components, the indicator may be repeatedly heated without developing internal stresses. To improve the visibility of the thermochromic layer, a lubricant film may be included between the separate components. Similarly, a liquid may be included within the housing for improving the modeling characteristics of the present invention.

By securing the sections together as in the present embodiment, the housing may be opened and the components replaced. For example, a thermochromic material responding to a different temperature may be substituted for indicating the occurrence of an alternative temperature condition within the object. In another form, an ultrasonic bond may be formed between the first and second sections to seal the components within the outer shell. Additionally, the sections may be force fit, snap fit, staked, or secured together by any other known securing means. The first and second sections may be permanently sealed together, or alternatively they may be releasably secured together for convenient replacement of the components.

Figure 3:
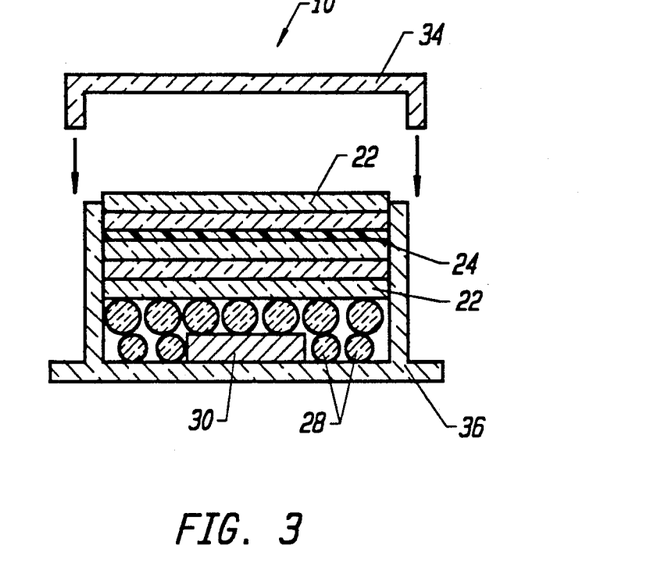
FIG. 3 shows a cross sectional view of another embodiment of the present invention, shown partially assembled.

Temperature indicator 10 is shown in FIGS. 3 and 4 with alternative means for securing first and second sections 34 and 36 together, such as the formation of an ultrasonic bond generally indicated at 38 between the first and second sections. When the first and second sections are secured together, first section 34 applies a compressive force to elements 22 and second section 36 causing the formation of a bulge or protrusion 40 (FIG. 4). The introduction of the compressive force confines the heat receiving elements within the outer shell and prevents the introduction of gaseous bubbles between adjacent elements 22. The gaseous bubbles would distort the appearance of thermochromic layer 24. In the present embodiment, the second section functions as a spring to compress the heat receiving elements together. Alternatively, a spring may be introduced below elements 22 to provide a compressive force for confining the heat receiving elements within the outer shell.

Figure 5:
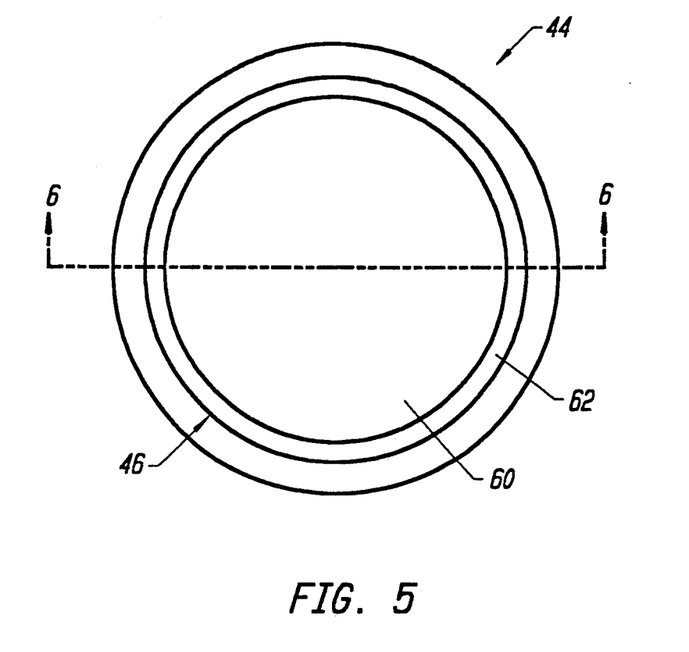
FIG. 5 shows a top plan view of an alternative embodiment of the temperature indicator of the present invention.
Figure 6:
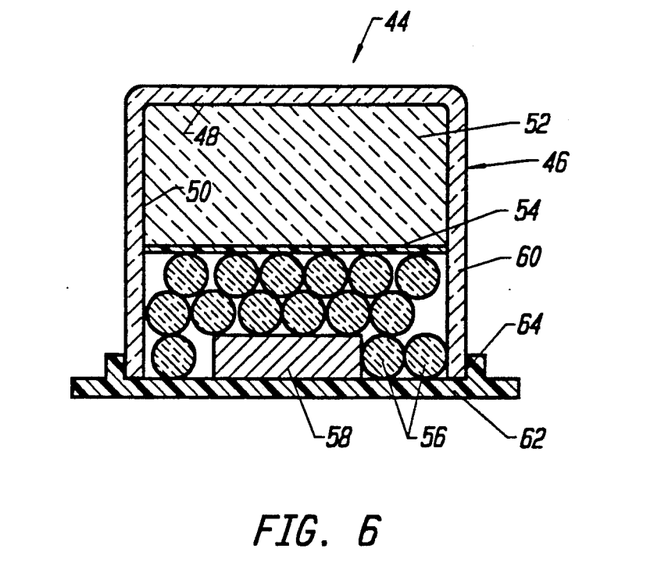
FIG. 6 shows a cross sectional view taken along line 6—6 of FIG. 5.

An alternative embodiment of a temperature indicator 44 incorporating the present invention is shown in FIGS. 5 and 6. Temperature indicator 44 includes outer shell 46 having an inner surface 48 defining cavity 50. The indicator includes means for modeling the temperature response characteristic of an object, such as heat receiving material 52. In the present embodiment, the heat receiving material substantially fills at least a portion of cavity 50. The heat receiving material is formed of a polymeric material having a thermal diffusivity such that heat permeates into the material and the object at proportional rates. Thus, when indicator 44 and an object are subjected to an external temperature environment, the heat receiving material models the temperature response within the material.

The temperature indicator of the present embodiment includes means for measuring the temperature within the outer shell, such as thermochromic layer 54. In the present embodiment, the housing and heat receiving material 52 are substantially transparent for displaying the thermochromic layer. As heat diffuses through the heat receiving material, the thermochromic layer responds to the temperature of material 52, thereby indicating the temperature condition within the object. As with the previously described embodiment, the thermochromic material for layer 54 is chosen to respond to a certain temperature condition within housing 46 to indicate a particular temperature condition of an object.

As is shown particularly in FIG. 6, temperature indicator 44 includes only one layer of thermochromic material. If desired, multiple thermochromic layers may be positioned within the housing. , The multiple thermochromic layers may be separated by a quantity of heat receiving material or a number of heat receiving elements similar to those found in the previously described embodiment. Thus, the present embodiment may be adapted for indicating the occurrence of different temperatures, or the same temperature occurring at different locations within housing 44.

A plurality of insulating elements 56 are contained within housing 44 below thermochromic layer 54. As with the previously described embodiment, the insulating elements isolate the thermochromic layer from a heat source located below the housing. A ballast element 58 stabilizes temperature indicator 44 when submerged in a fluid. Thus, the heat receiving material, insulating elements and housing may be formed of materials having a density less than that of the fluid.

Housing 44 includes first and second sections 60 and 62, and means for securing the first and second sections together, such as the formation of an ultrasonic bond generally indicated at 64. Other known securing means may be substituted for the ultrasonic bond, such as the threaded engagement of the previous embodiment. Sealing the heat receiving material and the other components of the temperature indicator within the housing offers several advantages. The heat receiving material is not bonded to the outer shell, substantially reducing the formation of internal stresses when the indicator is repeatedly exposed to a temperature gradient. Provided the thermochromic layer is in thermal contact with heat receiving material 52, it need not be embedded within the material. Insulating elements 56 may be included within the housing, allowing the size of housing 46 to be reduced providing a compact-sized temperature indicator.

Figure 7:
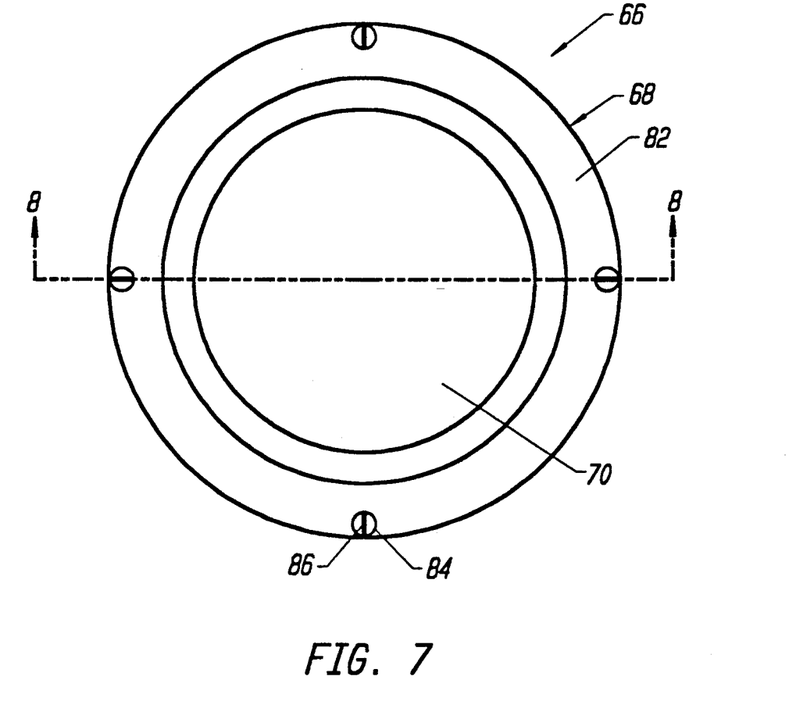
FIG. 7 shows a top plan view of another embodiment of the present invention.
Figure 8:
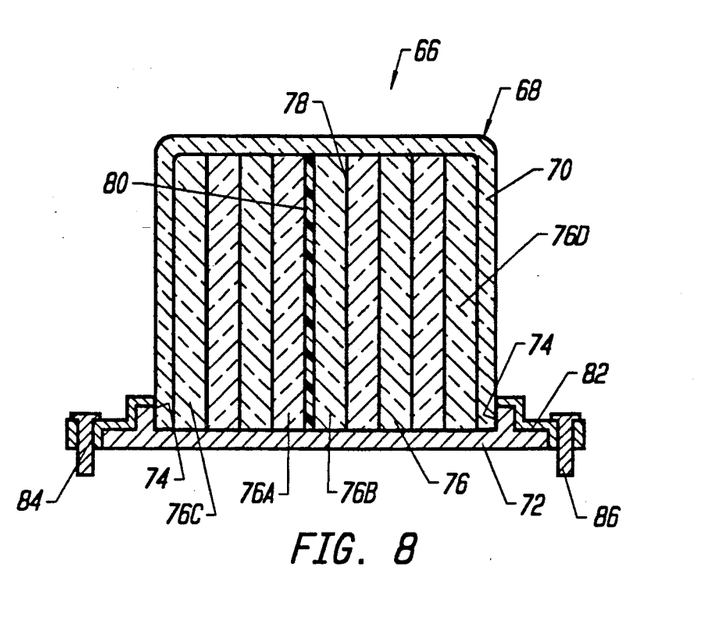
FIG. 8 shows a cross sectional view taken along line 7—7 of FIG. 7.

Another embodiment of a temperature indicator 66 incorporating the present invention is shown in FIGS. 7 and 8. The temperature indicator includes an outer shell 68 having first and section sections 70 and 72 secured together by the formation of an ultrasonic bond generally indicated at 74. A plurality of heat receiving elements 76 are enclosed within cavity 78 of the outer shell. A thermochromic layer 80 is positioned between elements 76A and 76B for indicating the temperature condition modeled by the heat receiving elements. A lubricant film is applied between adjacent heat receiving elements to reduce light reflection and improve the clarity of thermochromic layer 80.

With the previously discussed embodiment, the temperature indicator and the object are both placed within the temperature environment during the heating process. To determine the temperature condition of the object during heating, the appearances of thermochromic layers 24, 26 and 54 are monitored. Concurrently heating the temperature indicator and the object is not effective for monitoring the temperature condition when using a closed container, such as a pressure cooker, where the object and indicator are effectively concealed during the heating process. The temperature indicator and the thermochromic layers displaying the temperature condition of the object are not visible until the container is opened at the end of the process. Temperature indicator 66, however, is particularly suitable for modeling the temperature condition of an object heated in a sealed container.

The temperature indicator includes means for securing the outer shell or housing 68 to an exterior surface of a container, such as circular mounting bracket 82 having holes 84. In the present embodiment, the mounting bracket is mounted to the container by a plurality of threaded screws 86 inserted through holes 84 and into the surface of the container. Other known mounting devices may be substituted for the mounting bracket and threaded screws of the present embodiment. To model the internal temperature of an object heated within a container, the temperature indicator 66 is secured to the container with the heat receiving elements 76 and thermochromic layer 80 in thermal contact with an exterior surface of the container. In the present embodiment, the second section 72 is formed of a material which is conductive to heat. Thus, heat travels through the container from its interior and passes through second section 72 and into heat receiving elements 76 and thermochromic layer 80.

The heat receiving elements are formed of a material having a thermal diffusivity such that heat diffuses into the temperature indicator 66 at a rate proportional to the rate at which heat passes into the object. The thermochromic layer 80 responds to the heat permeating through the temperature indicator, providing an indication of the internal temperature condition of the object. With the present embodiment, heat must travel through the container wall before diffusing into the temperature indicator 66. The material forming the heat receiving elements is chosen to model the rate of heat diffusion into the object held within the container during the heating or sterilizing process.

In the present embodiment, the heat receiving elements and the thermochromic layer are both held in thermal contact with the exterior surface of the container. In alternative forms, the heat receiving elements alone may be in thermal contact with the container, with the thermochromic layer responding solely to heat diffusing through the elements. With some applications of the present invention, it may be desirable to substantially minimize the transfer of heat from the external environment into the temperature indicator 66. Heat receiving elements 76C and 76D adjacent the outer shell may be formed of an insulative material. Mounting bracket 82 may include a transparent, insulative cover (not shown) for surrounding the temperature indicator to eliminate heat transfer between the heat receiving elements and the environment.

The thermochromic layer may be formed of a reversible thermochromic material, or of an irreversible thermochromic layer if a permanent record of the internal temperature condition during the heating process is desired. The temperature indicator may include multiple thermochromic layers. To display the thermochromic layer, at least a portion of heat receiving elements 76 and housing 68 are formed of a transparent material. Since the temperature indicator is mounted to the exterior of the container, the temperature condition may be monitored without observing the object. Thus, the present invention is suitable for measuring the temperature of an object retained within a sealed container during the heating process.

While the previous embodiments have been described as indicating the temperature of an object during heating, it is to be understood that the present invention equally applies to the cooling of an object. As the object cools, heat emanates from the object and the indicator. The temperature indicating means, such as the thermochromic layer, will measure the temperature of the heat receiving elements, indicating the internal temperature of the object as it cools. The present invention may be used with any method used for heating or cooling an object.

What is claimed is:

1. A temperature indicator for indicating the temperature condition of an object while subjecting said object to an external temperature environment comprising:
an outer shell, at least a portion of said outer shell being substantially transparent;
means contained within said outer shell for modeling the thermal diffusivity of said object, at least a portion of said modeling means being substantially transparent, said modeling means including a plurality of heat receiving elements, which heat receiving elements are formed of a material having a thermal diffusivity such that when said heat receiving elements and said object are subjected to a temperature environment, the rate at which heat diffuses through heat receiving elements is proportional to the rate at which heat diffuses through said object; said outer shell comprising first and second sections which apply a compressive force to said modeling means when said first and second sections are secured together to thereby confine said modeling means within said outer shell; and
means for measuring the temperature within said outer shell, which measuring means is enclosed within said outer shell in thermal contact with said modeling means, said measuring means being positioned for at least partially displaying said measuring means through the transparent portions of said modeling means and said outer shell to indicate the temperature within said outer shell, said measuring means thereby indicating the temperature condition of said object.

2. The temperature indicator of claim 1 wherein said measuring means comprises at least one thermochromic layer contained within said outer shell for measuring the temperature of said modeling means, whereby said measuring means indicates the temperature condition of said object.

3. The temperature indicator of claim 2 wherein said measuring means further comprises multiple thermochromic layers in thermal contact with said modeling means for measuring the temperature within said outer shell.

4. The temperature indicator of claim 2 wherein said thermochromic layer is formed of a thermochromic material which changes between substantially opaque and substantially transparent at the occurrence of a predetermined temperature.

5. The temperature indicator of claim 2 wherein said thermochromic layer is formed of a thermochromic material which changes from a first color to a second color at the occurrence of a predetermined temperature.

6. The temperature indicator of claim 1 further comprising means for securing said first section to said second section.

7. The temperature indicator of claim 6 wherein said securing means comprises the formation of an ultrasonic bond between said sections.

8. The temperature indicator of claim 6 wherein said securing means includes a first threaded portion formed on said first section and a second threaded portion formed on said second section, whereby said threaded portions of said sections interengage to seal said outer shell.

9. The temperature indicator of claim 1 further comprising a ballast element contained within said outer shell for stability while said outer shell is submerged in a fluid.

10. The temperature indicator of claim 1 further comprising a ballast element contained within said outer shell for holding said outer shell in a stable, partially submerged condition in a fluid with said measuring means and at least a portion of said modeling means submerged in said fluid and a top portion of said outer shell exposed above said fluid for minimizing the heat transfer through said top portion of said outer shell, said measuring means being visible through said top portion.

11. The temperature indicator of claim 1 further comprising means for securing said outer shell to an outer surface of a container holding said object therein while said object is exposed to said external temperature environment in said container, said securing means mounting said outer shell to said container with at least one of said modeling means and said measuring means held in thermal contact with said outer surface.

12. The temperature indicator of claim 1 further comprising at least one insulating element contained within said outer shell for partially insulating said measuring means from the external temperature environment.

13. A temperature indicator for simulating the internal temperature of an object subjected to an external temperature environment, said temperature indicator comprising
   means for modeling the temperature response characteristic of said object, said modeling means including a plurality of individual heat receiving elements, at least a portion of at least one of said heat receiving elements being substantially transparent;
   temperature indicating means in thermal contact with at least one of said heat receiving elements to indicate the temperature of said modeling means; and
   a housing enclosing and sealing said modeling means and said temperature indicating means, at least a portion of said housing being substantially transparent and said temperature indicating means being positioned for exposing said temperature indicating means through the transparent portions of said housing and said at least one of said heat receiving elements for displaying the temperature of said modeling means; said housing comprising first and second sections which apply a compressive force to said modeling means when said first and second sections are secured together to thereby confine said modeling means within said housing.

14. The temperature indicator of claim 13 wherein said heat receiving elements are formed of a material having a thermal diffusivity such that when said elements and said object are subjected to a temperature environment, the temperature response characteristic of said object is proportional to the temperature response characteristic of said elements.

15. The temperature indicator of claim 13 wherein said temperature indicating means comprises at least one thermochromic layer for indicating the temperature within said housing.

16. The temperature indicator of claim 15 wherein said thermochromic layer is formed of a thermochromic material which changes from a first color to a second color to indicate the occurrence of a predetermined temperature within said housing;

17. The temperature indicator of claim 15 wherein said thermochromic layer is formed of a thermochromic material which changes between substantially transparent and substantially opaque at the occurrence of a predetermined temperature.

18. The temperature indicator of claim 13 further comprising a ballast element enclosed within said housing for stability when said housing is in an at least partially submerged condition in a fluid with said temperature indicating means and at least a portion of said modeling means submerged in said fluid and a top portion of said housing exposed above said fluid for minimizing the transfer of heat through said top portion of said housing.

19. The temperature indicator of claim 13 wherein said housing includes means for securing said housing to an exterior surface of a container in which said object is positioned for exposure to said external temperature environment in said container, said securing means mounting said housing to said container with at least one of said modeling means and said temperature indicating means held in thermal contact with said exterior surface.

20. The temperature indicator of claim 13 further comprising at least one insulating element contained within said housing for partially insulating said temperature indicating means form the external temperature environment.

21. A temperature indicator for indicating the temperature condition of an object retained within a container for exposure to an external temperature environment in said container, said container having an exterior surface, said indicator comprising:
   an outer shell, at least a portion of said outer shell being substantially transparent;
   a plurality of heat receiving elements sealed within said outer shell to model the thermal diffusivity of said object, at least a portion of at least one of said heat receiving elements being substantially transparent;
   measuring means in thermal contact with said heat receiving elements for measuring the temperature within said outer shell, which measuring means is contained within said outer shell and positioned for display of said measuring means through the transparent portion of said at least one of said heat receiving elements and the transparent portion of said outer shell for displaying the temperature within said outer shell;
   said outer shell comprising firs and second sections which apply a compressive force to said plurality of heat receiving elements when said first and second sections are secured together to thereby confine said heat receiving elements within said outer shell; and 22. The temperature indicator of claim 21 wherein said measuring means comprises a first thermochromic layer positioned below at least one of said elements for measuring the temperature within said outer shell.

23. The temperator indicator of claim 22 wherein said thermochromic layer is formed of a thermochromic material having an initial color said thermochromic material changing from said initial color at the occurrence of a predetermined temperature.

24. The temperature indicator of claim 21 wherein said measuring means comprises multiple thermochromic layers in thermal contact with said heat receiving elements for measuring the temperature within said outer shell, said multiple thermochromic layers being separated by at least one of said elements.

25. The temperature indicator of claim 21 wherein said measuring means comprises a thermochromic material applied to one of said elements.

26. The temperature indicator of claim 21 further comprising means for securing said first section to said second section.

27. A temperature indicator for indicating the temperature condition of an object comprising:
   an outer shell;
   a plurality of heat receiving elements sealed within said outer shell to model the thermal diffusivity of said object, which heat receiving elements are formed as thin disks of a polymeric material having a thermal diffusivity such that when said object and said disks are exposed to an external change in temperature, the rate at which heat diffuses through said disks is proportional to the rate at which heat diffuses through said object; and
   measuring means in thermal contact with said modeling means for measuring the temperature within said outer shell.

28. A temperature indicator for indicating the temperature condition of an object comprising:
   an outer shell;
   a plurality of heat receiving elements sealed within said outer shell to model the thermal diffusivity of said object;
   a lubricant film between said elements, said film having an index of refraction substantially equal to that of said elements for minimizing the reflection of light passing through said elements; and
   measuring means in thermal contact with said modeling means for measuring the temperature within said outer shell.

29. A temperature indicator for indicating the temperature condition of an object comprising:
   an outer shell;
   a plurality of heat receiving elements sealed within said outer shell to model the thermal diffusivity of said object;
   measuring means in thermal contact with said modeling means for measuring the temperature within said outer shell; and
   at least one insulating element contained within said outer shell for partially insulating said measuring means from the external temperature environment.

30. A temperature indicator for simulating the internal temperature of an object subjected to a temperature environment comprising:
   a housing having first and second sections and an inner surface defining a cavity, at least a portion of said housing being substantially transparent;
   a hat receiving material substantially filling at least a portion of said cavity for modeling the temperature response characteristic of said object, said heat receiving material adjoining said inner surface of the filled portion of said cavity for providing for thermal communication between said housing and said heat receiving material, at least a portion of said heat receiving material being substantially transparent;
   means for measuring the temperature within said housing, which measuring means is enclosed within said housing in thermal contact with said heat receiving material, whereby said measuring means simulates the internal temperature of said object, said measuring means being positioned relative to the transparent portions of said housing and said heat receiving material for displaying said measuring means through the transparent portions of said housing and said heat receiving material; and
   means for securing said first and second sections together substantially sealing said housing with said heat receiving material and said measuring means enclosed therein; said first and second sections applying a compressive force to said heat receiving material when said first and second sections are secured together to thereby confine said heat receiving material within said housing.

31. The temperature indicator of claim 30 wherein said heat receiving material is formed of a polymeric material having a thermal diffusivity such that when said object and said heat receiving material are exposed to an external change in temperature, the rate at which heat diffuses through said heat receiving material is proportional to the rate at which heat diffuses through said object.

32. The temperature indicator of claim 30 wherein said measuring means comprises a layer of thermochromic material for measuring the temperature within said housing, whereby said measuring means indicates the temperature condition of said object.

33. The temperature indicator of claim 32 wherein said thermochromic layer is formed of a thermochromic material which changes between substantially opaque and substantially transparent at the occurrence of a predetermined temperature.

34. The temperature indicator of claim 30 wherein said securing means comprises the formation of an ultrasonic bond between said shell sections.

35. The temperature indicator of claim 30 wherein securing means includes a first threaded portion formed on said first section and a second threaded portion formed on said second section, whereby said threaded portions of said sections interengage to seal said housing.

36. The temperature indicator of claim 30 further comprising a ballast element contained within said housing for stability when said housing is at least partially submerged in a fluid with said measuring means and at least a portion of said heat receiving material submerged in said fluid and a top portion of said housing exposed above said fluid for minimizing thermal communication through said top portion of said housing.

37. The temperature indicator of claim 30 further comprising at least one insulating element contained within said housing for partially insulating said measuring means from the external temperature environment.

38. The temperature indicator of claim 30 wherein said housing includes means for mounting said housing to an outer surface of a container, said container holding said object therein for exposure to said external temperature environment in said container, said mounting means securing said housing to said container with at least one of said heat receiving material and said measuring means held in thermal contact with said outer surface.

* * * * *